(No Model.)

F. NISHWITZ.
HARROW.

No. 262,307. Patented Aug. 8, 1882.

WITNESSES
W<sup>m</sup> A. Skinkle
Edwin A. Newman.

INVENTOR
Frederick Nishwitz.
By his Attorneys
Baldwin, Hopkins & Payton.

UNITED STATES PATENT OFFICE.

FREDERICK NISHWITZ, OF MILLINGTON, NEW JERSEY.

HARROW.

SPECIFICATION forming part of Letters Patent No. 262,307, dated August 8, 1882.

Application filed February 3, 1882. (No model.)

*To all whom it may concern:*

Be it known that I, FREDERICK NISHWITZ, of Millington, in the county of Morris and State of New Jersey, have invented certain new and useful Improvements in Harrows, of which the following is a specification.

The purpose of my invention is to produce a simple, light, and cheap harrow which will act upon the soil in a most efficient manner. With this object in view I have devised a machine having a tongue or draft-pole and a single transverse gang-bar carrying trailing or dragging harrow-teeth of a peculiar character, which will hereinafter be fully described. This gang-bar also serves as a clod crusher or leveler for the purpose of breaking up clods and smoothing down minor irregularities of the surface.

I do not limit myself to a machine having a transverse bar which constitutes a leveler as well as a gang-bar, as a machine in which the single cross-bar constitutes a gang-bar only could be made without departing from some of the features of my invention, and would doubtless be very efficient and practical in certain classes of soil. Nor do I wish to limit myself, so far as part of my invention is concerned, to a bar having teeth of the special character shown.

The invention consists in certain novel features and organizations, which will hereinafter be described and claimed.

Figure 1:
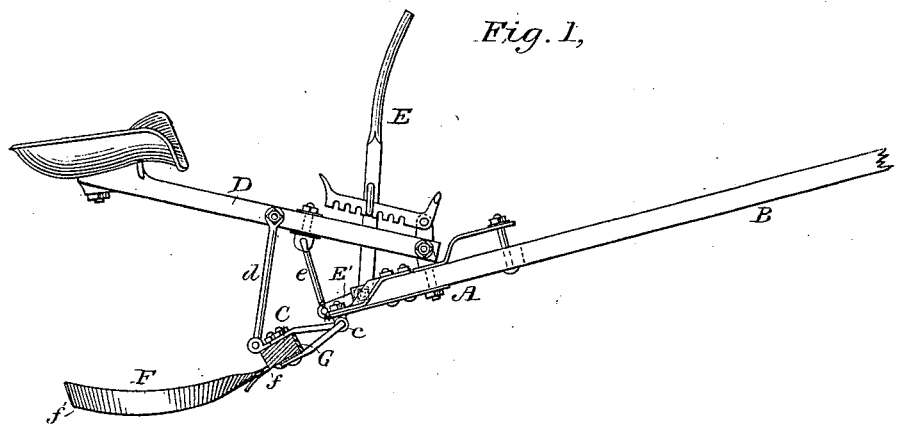
Figure 2:
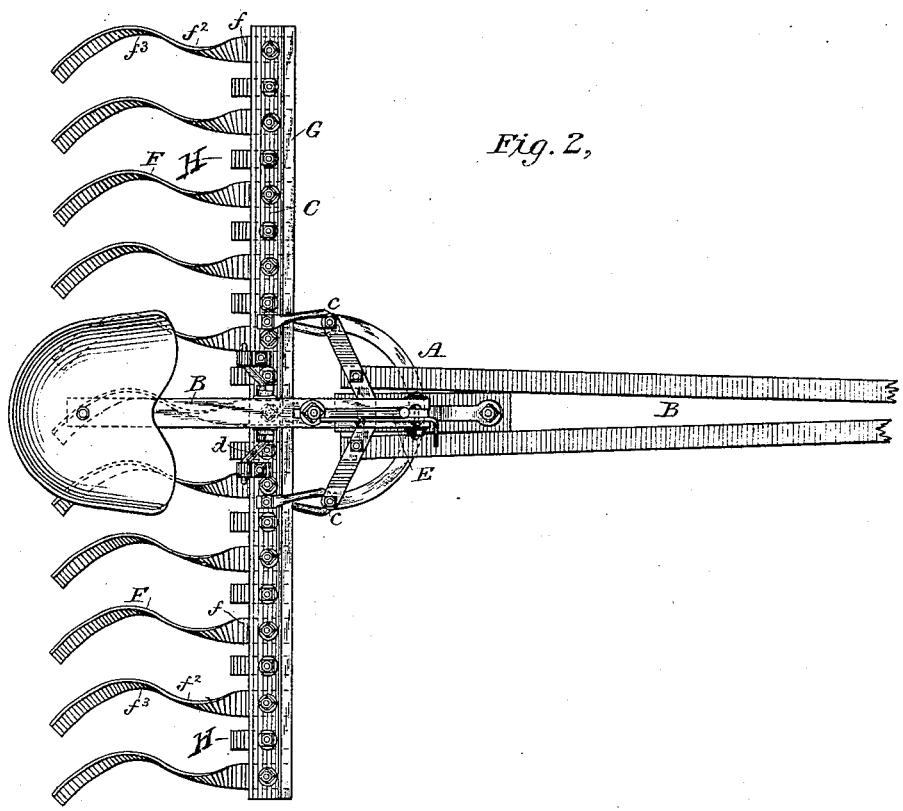

In the accompanying drawings, Figure 1 is a vertical sectional view, and Fig. 2 is a plan view of my improved machine.

The gang-bar and crusher C is hinged at $c\ c$, by suitable straps, to the draft frame or tongue A B. The seat-standard D is pivoted upon the tongue or frame, and is supported by pivoted rods $d\ d$ on the gang-bar. A lever, E, pivoted on the frame and preferably working in a slot in the seat-standard, has a bent end or rearwardly-projecting extension, E', which is connected with the seat-standard by a link, $e$. The lever is held in any desired position by a pivoted notched dog or detent, which engages with an eye thereon. The gang-bar and crusher is hinged to the frame so that its lower face inclines upwardly and, as will be understood, acts as a crusher or leveler to break up clods and smooth the ground. It will be obvious that by operating the lever the gang-bar may be swung up or down on its hinges to vary the relation of its crushing-face and of the harrow-teeth to the ground. The harrow-teeth F have flat surfaces $f$ for attachment to the gang-bar, and their ends are placed under the edge of the angle-strip G, which faces the lower front edge of the bar. Flat rearwardly-projecting spurs or disintegrators H are placed between the teeth and similarly secured under the angle-strip. The spurs and the flat portions of the teeth constitute a substantially metal-faced open-slotted or comb-like crusher-bar. Such a bar and the special manner of applying the teeth and spurs thereto are, however, not claimed herein.

The machine above described is exceedingly simple in construction and operation. It has a single transverse bar which carries a gang of trailing or dragging harrow-teeth, and which may be adjusted to vary the relation of the teeth to the ground. The single transverse gang-bar also constitutes a clod crusher and leveler, so that the ground is treated in the most perfect manner. The machine organized as above set forth operates to crush and smooth the surface of the ground and then cut it up and harrow it very much after the manner of the machine shown in my Letters Patent No. 225,634, granted March 16, 1880. In the latter machine, however, two cross-bars are used, one being distinctively a crusher and the other a gang-bar. It will be plain that the machine herein described is simpler, cheaper, and lighter, and yet will operate thoroughly upon the soil.

In order to act upon the soil in the most perfect manner, leave it in a uniform condition, and yet cause the machine to run in a straight line, I have devised the teeth F shown in the drawings. These teeth have a single cutting-blade, which has a curved or rocker-shaped cutting-edge, $f'$, and is so sinuously curved relatively to the line of draft as to cause it to cut at two points at opposite angles relatively to the draft-line. Thus the face at $f^2$ cuts at one angle and tends to press the machine to one side, and the face $f^3$ cuts at another angle and tends to press the machine in the opposite direction. Each tooth therefore exerts a pressure upon the soil in opposite directions, and as a result there is no tendency for the machine to move out of a straight line. The teeth, as before mentioned, have a flat surface for attachment to the gang-bar. They are then twisted to present a trailing cutting-edge to the soil and sinuously curved, as set forth. Teeth thus shaped can be arranged upon the frame in a uniform relation to each other, and will thoroughly cut and break up the entire surface, leaving it in a uniform condition. Their leading characteristic is that they have a single blade which cuts at different angles relatively to the draft at different points in its length, and thus presses upon the soil equally in opposite directions. The curved or rocker-shaped cutting-edge $f'$ bears such relation to the soil as to bring the opposing faces $f^2 f^3$ of the tooth into proper relation to the ground.

Further description of the operation is deemed unnecessary.

I am aware that a machine having a short plow draft bar or frame, a transverse gang-bar, and a series of rearwardly-inclined downwardly-projecting straight teeth is old, and I therefore make no claim to such an organization.

What I claim as my invention is—

1. The herein-described harrow, consisting essentially solely of a tongue, a single transverse gang-bar connected to the tongue and also constituting a crusher-bar, and curved trailing harrow-teeth carried by the bar, substantially as set forth.

2. The combination of a draft frame or tongue, a single transverse bar hinged thereto, a lever for swinging the bar on its hinge-connection to vary its relation to the frame and to the ground, harrow-teeth carried by the bar, and a driver's seat supported on the bar, substantially as set forth.

3. The combination, substantially as set forth, of a draft frame or tongue, a single transverse gang-bar in rear thereof and hinged thereto so as to rise and fall in rear of the tongue or frame, harrow-teeth carried by said bar, and a lever for raising and lowering or swinging the bar on its hinge to vary its relation bodily to the frame and ground.

4. The combination of a draft frame or tongue, a single transverse bar hinged thereto, harrow-teeth carried by the bar, and a seat-standard pivoted on the frame or tongue and supported on the transverse bar, substantially as set forth.

5. The combination of a draft frame or tongue, a single transverse bar hinged thereto, harrow-teeth carried by the bar, a seat-standard pivoted on the frame or tongue and supported by pivoted rods on the transverse bar, a lever on the frame, a connection between the lever and transverse bar, and a detent, substantially as set forth.

6. The trailing harrow-tooth herein described, having a continuous curved cutting-edge and two opposing cutting-faces which press upon the soil in opposite directions relatively to the draft and insure the rectilinear motion of the machine.

7. A dragging or trailing harrow-tooth curved sinuously or reversely relatively to a longitudinal central line, and having a continuous sinuous rocker-shaped cutting-edge.

8. The combination of a draft frame or tongue, a transverse bar, and a series of harrow-teeth, each of which is sinuously or reversely curved relatively to the draft-line, substantially as and for the purpose set forth.

9. The combination of the draft frame or tongue, a single transverse bar connected therewith, and a series of harrow-teeth carried by the bar, which teeth are formed with a continuous cutting-edge, and are shaped so as to present two opposing cutting-faces to the soil, substantially as and for the purpose set forth.

In testimony whereof I have hereunto subscribed my name this 2d day of February, 1882.

FREDERICK NISHWITZ.

Witnesses:
GEO. T. PINCKNEY,
DUANE H. NASH.